United States Patent
Donkervoet et al.

(10) Patent No.: US 10,790,601 B1
(45) Date of Patent: Sep. 29, 2020

(54) ELECTRICAL CONDUCTOR PASS THROUGH PLATE CONSTRUCTIONS

(71) Applicant: TE Connectivity Services GmbH, Schaffhausen (CH)

(72) Inventors: Oliver Donkervoet, Lewisville, NC (US); David Allen Klein, Kernersville, NC (US); Rohan Narang, High Point, NC (US)

(73) Assignee: TE CONNECTIVITY SERVICES GMBH, Schaffhausen (CH)

( * ) Notice: Subject to any disclaimer, the term of this patent is extended or adjusted under 35 U.S.C. 154(b) by 0 days.

(21) Appl. No.: 16/695,064

(22) Filed: Nov. 25, 2019

(51) Int. Cl.
*H01R 9/18* (2006.01)
*H02G 3/22* (2006.01)

(52) U.S. Cl.
CPC ............. *H01R 9/18* (2013.01); *H02G 3/22* (2013.01)

(58) Field of Classification Search
CPC .................................... H01R 9/18; H02G 3/22
USPC ........................................................ 174/663
See application file for complete search history.

(56) References Cited

U.S. PATENT DOCUMENTS

| | | | | |
|---|---|---|---|---|
| 1,731,597 A * | 10/1929 | Spear | ............. | H01B 17/305 439/206 |
| 2,768,231 A * | 10/1956 | Schwennesen | ........ | H01G 2/103 174/652 |
| 3,457,441 A * | 7/1969 | Hipps | ............. | H01B 17/306 310/71 |
| 5,227,587 A * | 7/1993 | Paterek | ............. | H01B 17/305 174/151 |
| 5,486,120 A * | 1/1996 | McMills | ............. | H01R 13/6397 439/306 |
| 5,980,329 A * | 11/1999 | Klein | ............. | H01R 43/24 439/736 |
| 6,114,633 A * | 9/2000 | Duhancik | ............. | H01R 13/521 174/135 |
| 6,964,579 B2 * | 11/2005 | Seminara | ............. | F42B 3/26 439/188 |
| 7,108,489 B2 * | 9/2006 | Yap | ............. | F01C 21/10 417/410.1 |
| 7,931,507 B2 * | 4/2011 | Yu | ............. | H01R 13/426 439/607.01 |

(Continued)

*Primary Examiner* — Timothy J Thompson
*Assistant Examiner* — Michael F McAllister

(57) ABSTRACT

Pass through plates have a body with an opposed first surface and second surface and an attachment member extending therethrough. The attachment member includes a wall structure configured to accommodate placement of an electrical conductor therein. The attachment member may include a recessed section configured to accommodate an outer section of the electrical conductor to prevent rotational movement of the electrical conductor therein. A retaining element is configured to contact the electrical conductor and retain axial placement of the electrical conductor within the attachment member when the electrical conductor is installed in the wall structure. The retaining element may comprise one or more latch elements extending along the attachment member wall and configured to move radially. The retaining element may be configured to contact a portion of the electrical conductor once installed in the attachment member. The attachment element and retaining element are integral with the pass through plate body.

20 Claims, 7 Drawing Sheets

(56) References Cited

U.S. PATENT DOCUMENTS 8,921,700 B2 * 12/2014 VandenEynden ...... H01B 17/30
                                          174/152 GM
9,431,730 B2 *  8/2016 Oda ........................ H01R 9/18

* cited by examiner

ELECTRICAL CONDUCTOR PASS THROUGH PLATE CONSTRUCTIONS

FIELD

Pass through plate constructions generally relate to plates used for passing electrical elements between different compartments or through portions of a vehicle or the like, and more specifically, plate constructions that are specially configured to accommodate an attachment with an electrically conductive element or power stud.

BACKGROUND

Pass through plates are known to be used in, for example, vehicles (e.g., trucks and the like) for enabling the passage of electrical elements, cables, and/or conductors between the passenger cabin and the engine compartment of the vehicle. For this reason, such pass through plates may be referred to as cabin pass through (CPT) plates. In various embodiments, such pass through plates may be disposed in the cabin and may be attached to a pedal plate or panel located inside of the cabin near the operating pedals for the vehicle. Such pass through plates are formed from an electrically nonconductive material and include openings therethrough to accommodate placement of the electrical elements, cables, and/or conductors running between the vehicle engine compartment and the cabin.

Conventional pass through plates may include one or more of an electrical conductor, terminal, or power stud that may be in the form of a solid electrically conductive member that is attached with the pass through plate and that includes ends projecting from opposed surfaces of the pass through plate. The electrical conductor may include attachment features adjacent opposed ends for connecting with respective electrical connectors or the like on each side of the pass through plate, e.g., both inside the cabin and the engine compartment. Configured in this manner, the electrical conductor enables the transfer of electricity between the vehicle cabin compartment and the engine compartment. Conventional pass through plates are configured with the electrical conductor encapsulated by the pass through plate material (e.g., encapsulated during the process of forming the pass through plate) with only the terminals or end portions of the electrical conductor exposed and extending from opposed surfaces of the pass through plate.

Configured in this manner, the electrical conductor is immovably fixed to the pass through plate. While such conventional approach of attaching the electrical conductor to the pass through plate operates to fix placement of the electrical conductor to the pass through plate, if the electrical conductor encounters certain loads, impacts or other forces during use, this may cause the electrical conductor to break away from the encapsulated attachment with the pass through plate. Once the electrical conductor has broken away from the pass through plate, this may present a danger and possible safety issue if an uninsulated portion of the electrical conductor comes into contact with an adjacent electrically conductive element or a portion of the vehicle. Additionally, once the electrical conductor attachment is broken in such conventional pass through plate construction, correcting or fixing the issue typically requires the removal and replacement of the entire pass through plate, which is often costly and time consuming.

Therefore, it is desired that pass through plates be constructed in a manner that facilitates attachment with one or more electrical conductors in a manner that avoids the above-noted deficiency of conventional pass through plates, thereby reducing or eliminating the associated time and cost of replacing the entire pass through plate in the event that such electrical conductor becomes damaged and/or detached. It is further desired that pass through plates be constructed in a manner that provides an improved degree of attachment strength and robustness from lateral forces that may be imposed on the electrical conductor during use, thereby extending effective pass through plate service life.

SUMMARY

Pass through plates as disclosed herein are configured to accommodate attachment with one or more electrical conductors therethrough and are configured to be attached with an external object such as a pedal plate or panel when used in a vehicle application. In various embodiments, the pass through plate comprises a body having an opposed first surface and second surface. The body may include a number of holes positioned along a peripheral edge of the body along the first surface for attaching the pass through plate to an external object. The pass through plate includes an attachment member that extends between the first surface and the second surface and that comprises an axially extending wall structure configured to accommodate placement of an electrical conductor axially therein. The attachment member may include a recessed section having a shape that complements a shape of an outer section of the electrical conductor so that the placement of the electrical conductor outer section therein operates to restrain or prevent rotational movement of the electrical conductor relative to the pass through plate. In various embodiments, the attachment member is integral with the body forming a one-piece construction.

A retaining element is configured to contact the electrical conductor and retain axial placement of the electrical conductor within the attachment member when the electrical conductor is installed in the pass through plate. In various embodiments, the retaining element may comprise one or more latch elements extending axially along the attachment member wall structure that are configured to move radially relative to the attachment member wall structure. In various embodiments, the latch element may comprise a radially inwardly projecting lip configured to contact a portion of the electrical conductor once installed in the attachment member. In various embodiments, the latch element may include a surface feature adjacent a peripheral end for engagement from a position outside of the attachment member to move the latch element radially out of contact with the electrical conductor to facilitate electrical conductor removal. In various embodiments, there may be one or more pairs of latch elements, and each latch element pair may include latch elements positioned diametrically opposed from one another. In various embodiments, the latch elements are integral with the attachment member.

In various embodiments, the retaining element may comprise an external element, such as a clip or the like, that is configured to mechanically attach with a portion of the electrical conductor once disposed within the attachment member. In various embodiments, the clip is sized larger than a peripheral end of the attachment member wall structure to prevent the clip from moving axially into the wall structure when attached with the electrical conductor. In various embodiments where an external retaining element is used, a section of the pass through plate first or second surface adjacent to the attachment member may be configured to facilitate lateral access to the attachment member for purposes of installing the clip.

Configured in this manner, pass through plates enable attachment with one or more electrical conductors in a manner that allows the electrical conductor to be removed from the pass through plate and replaced without having to remove and replace the pass through plate, thereby saving time and cost. Further, pass through plates as disclosed herein comprise attachment members that are configured to provide an improved degree of lateral support to the electrical conductor when attached thereto, to thereby protect the electrical conductor attachment from possible breakage or detachment that may occur from external lateral forces placed on the electrical conductor during use.

BRIEF DESCRIPTION OF THE DRAWINGS

Pass through plate constructions as disclosed herein will now be described by way of example with reference to the accompanying figures, wherein like reference numerals refer to like elements, and of which.

DETAILED DESCRIPTION

Figure 1:
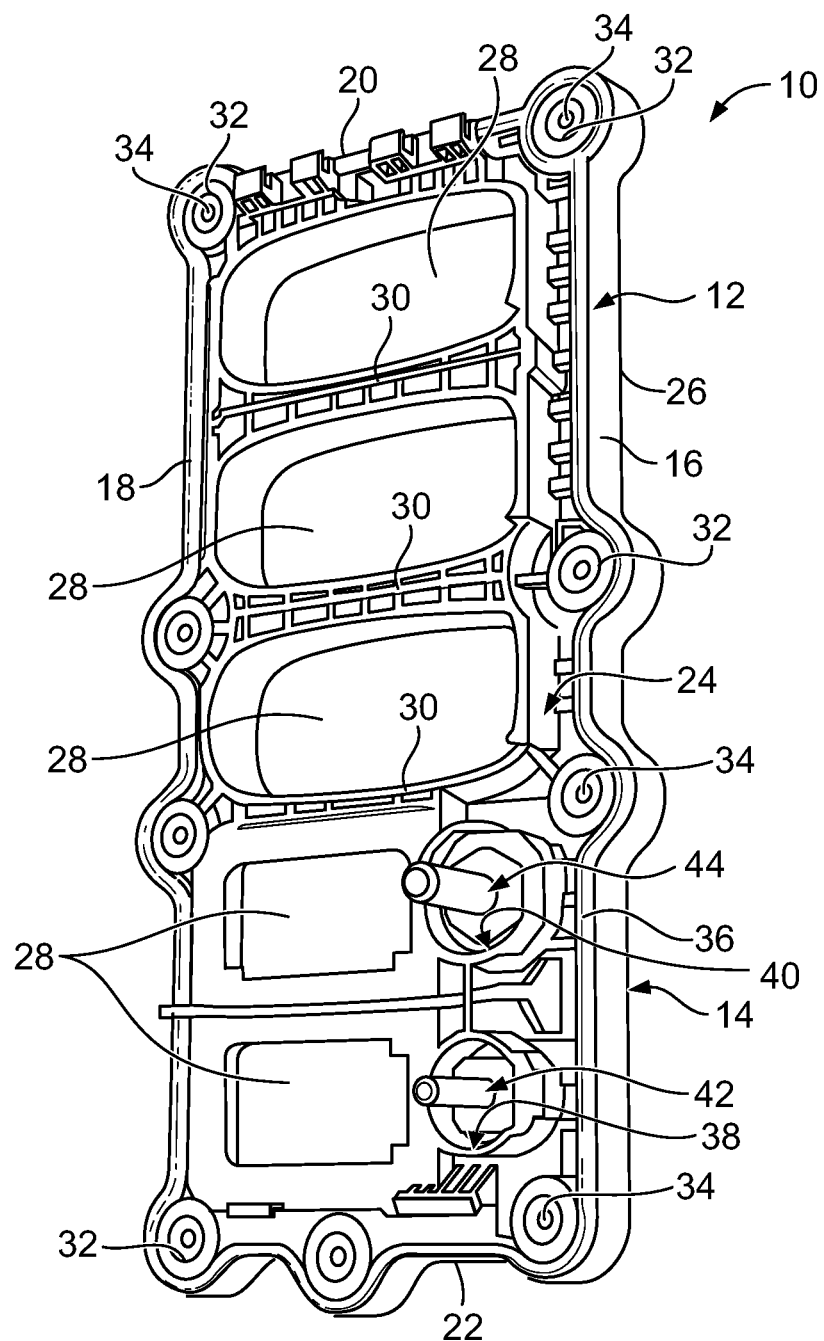
FIG. 1 is a perspective view of an example pass through plate in an assembled state, in accordance with various embodiments.

Embodiments of pass through plates and electrical conductors or power studs as used therewith will be described hereinafter in detail with reference to the attached drawings, wherein like reference numerals refer to the like elements. Pass through plates and electrical conductors or power studs as disclosed herein may, however, be embodied in many different forms and should not be construed as being limited to the embodiments set forth herein; rather, these embodiments are provided so that the disclosure will be thorough and complete, and will fully convey the concept of pass through plates and electrical conductors to those skilled in the art.

Pass through plates 10 and electrical conductors 42 and 44 or power studs as used therewith are generally configured as separate parts that are connected together. The electrical conductors are fixedly attached to the pass through plates for a desired end-use application, e.g., attached to a pedal plate or panel disposed in a pedal box of a vehicle passenger compartment. Pass through plates 10 are configured having one or more attachment members 38 and 40 that may be integral with the pass through plate 10 and are configured to accommodate placement of one or more electrical conductors 42 and 44 therethrough and retain the electrical conductors 42 and 44 in a fixed or attached state (e.g., axially and/or rotationally) for use in the desired application. The electrical conductors 42 and 44 may be configured having one or more surface features that cooperate with one or more elements or surface features of the pass through plate attachment members 38 and 40 to facilitate attachment therewith. A feature of pass through plates 10 and electrical conductors 42 and 44 configured in such manner is the ability to replace an electrical conductor (e.g., in a situation where the electrical conductor has become damaged or the like) with a new electrical conductor without having to fully or partially remove and replace the entire pass through plate. Further, the attachment between the electrical conductor and the pass through plate may optionally be configured to provide a seal therebetween, which may be a leak-tight seal, if a seal is called for by a particular end-use application.

Figure 2:
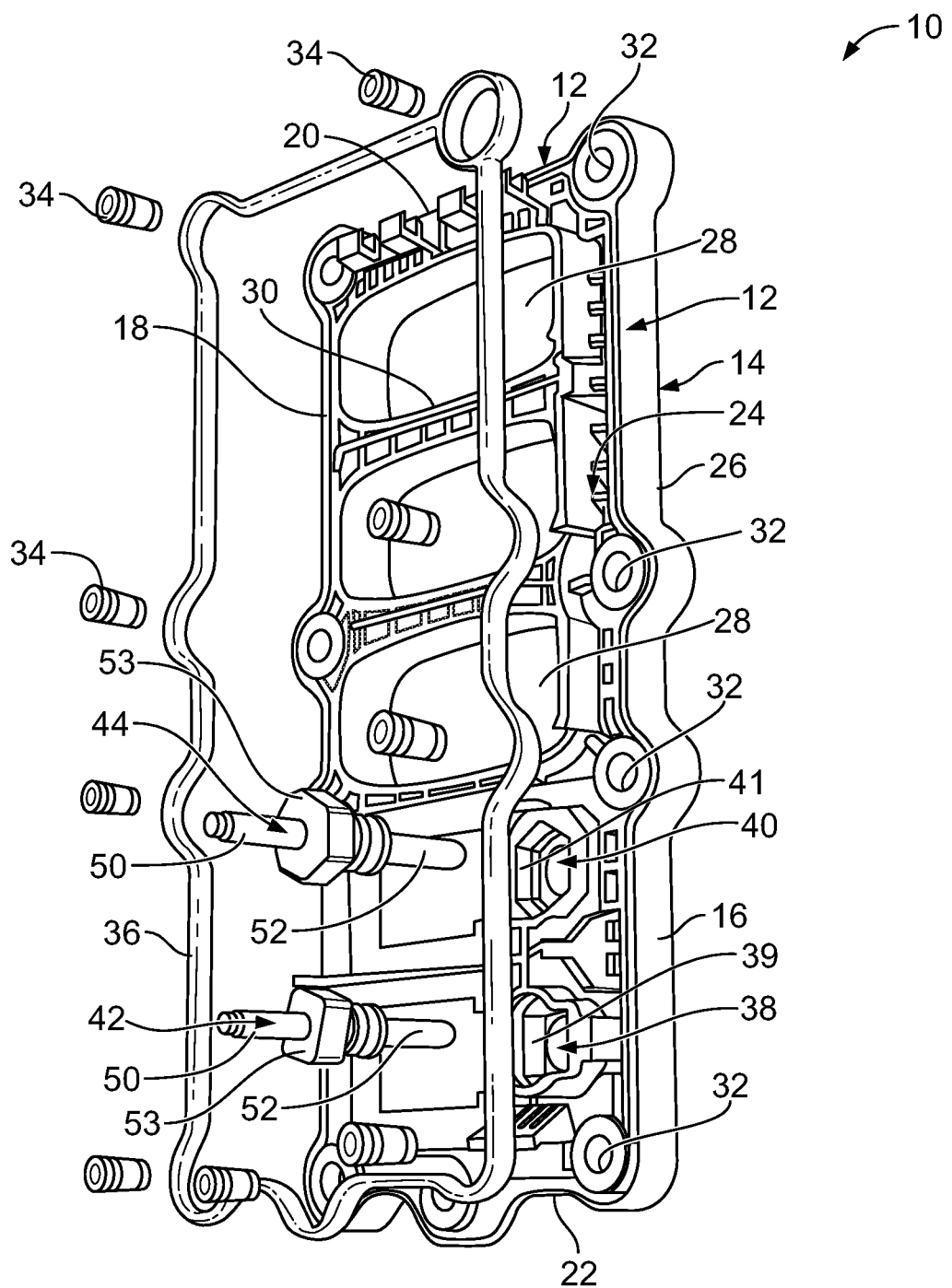
FIG. 2 is a perspective view of the example pass through plate of FIG. 1 in an unassembled state, in accordance with various embodiments.

FIGS. 1 and 2 illustrate an example pass through plate 10 as disclosed herein comprising a body 12 that is sized and shaped to facilitate attachment with a desired external object such as an opening within a pedal plate or panel of a vehicle. In various embodiments, the pass through plate body 12 is configured having a rectangular shape and includes an outer section 14 that defines the outside dimension of the pass through plate. The body outer section 14 includes opposed long sides 16 and 18 and opposed short sides 20 and 22. In various embodiments, the body 12 is formed from an electrically nonconductive material. Examples of such electrically nonconductive materials include, for example, polymeric materials, polyvinyl chloride, plastics and the like. The body 12 has a generally flat or planar configuration with a first surface 24 and opposed second surface 26, wherein first surface 24 is configured for contact and attachment with a desired external object such as a pedal plate of a vehicle, and the opposed second surface 26 is an external surface that may reside within a pedal box inside of a passenger compartment or cabin of a vehicle. In various embodiments, the pedal plate separates the vehicle passenger compartment from the vehicle engine compartment.

The pass through plate body 12 comprises a number of openings 28 extending through a thickness of the body as defined between the first surface 24 and second surface 26, and that are positioned and configured to accommodate placement and passage of electrical elements or cables (e.g., in the form of a wiring harness or the like) therethrough. The openings 28 are defined by web sections 30 that extend between the body long sides 16 and 18. In various embodiments, the openings 28 may be positioned and configured to accommodate placement of a wiring harness or the like therein to facilitate passage of the wiring harness between a vehicle passenger and engine compartment. While an example pass through plate 10 has been illustrated having five openings 28 that are generally rectangular in configuration, it is to be understood that the number, shape, and placement position of such openings 28 in the pass through plate can and will vary on the particular end-use application, and all such variations are intended to be within the scope of pass through plates 10 as disclosed herein.

The pass through plate body 12 includes a number of mounting or attachment holes 32 disposed along the body outer section 14 that are each fitted with inserts 34 configured to be fixedly attached within the holes 32. In various embodiments, the inserts 34 are metallic and are sized and configured to accommodate attachment with fastening elements (not shown) that are used to mount and secure attachment of the pass through plate 10 to the pedal plate or panel. In various embodiments, the fastening elements are threaded fasteners or screws that threadedly engage the inserts 34 to mount the pass through plate 10 to the pedal plate. While an example pass through plate has been illustrated as comprising inserts for accommodating attachment with the external object or pedal plate, it is to be understood that pass through plates as disclosed herein may be attached to the pedal plate by slides or clips or other means of attachment that do not involve the use of the inserts and that such other means of attachment are intended to be within the scope of pass through plates as disclosed herein.

The body first surface 24 includes a recessed channel extending along a peripheral edge of the first surface 24 and that is configured to accommodate placement of a seal member 36 therein. The seal member 36 projects outwardly a distance from the first surface 24 and is used to provide a seal, which may be a leak-tight seal, between the pass through plate 10 and the pedal plate when the pass through plate 10 is attached thereto by compression of the seal member 36 against an adjacent surface of the pedal plate. It is to be understood that the use of the seal member 36 for providing a seal between the pass through plate 10 and the pedal plate is optional and may not be called for in certain end-use applications.

The pass through plate body 12 includes attachment members 38 and 40 that are each configured to accommodate attachment with electrical conductors or power studs 42 and 44. In various embodiments, the electrical conductors 42 and 44 may be sized differently depending on the particular end-use application. For example, in an end use where two different voltages (e.g., 12 volts and 24 volts) are being transferred through the pass through plate via the electrical conductors, the electrical conductor 42 transferring 12 volts may be sized smaller than the electrical conductor 44 transferring 24 volts. In various embodiments, one electrical conductor may be an M6 sized electrical conductor and another electrical conductor may be an M8 sized electrical conductor. In such an example, the attachment members 38 and 40 are sized accordingly to provide an attachment with the differently-sized electrical conductors 42 and 44. Details about the attachment mechanism between the electrical conductors 42 and 44 and the respective attachment members 38 and 40 will be described below.

The attachment members 38 and 40 are positioned within the body at locations called for by the particular end-use application, which is understood to vary. In various embodiments, the body attachment members 38 and 40 are integral with the body 12 (e.g., are formed together with the body 12), and are positioned vertically adjacent to one another along the body long side 16. In various embodiments, a section of the attachment members 38 and 40 may be configured to complement a section of the respective electrical conductors 42 and 44 for purposes of preventing rotational movement of the electrical conductors 42 and 44 once disposed in the section of the attachment members 38 and 40. For example, referring to FIG. 2, the attachment member 38 includes section 39 and the attachment member 40 includes section 41. The sections 39 and 41 are each configured having a geometric shape that complements section 53 of the respective electrical conductors 42 and 44 for preventing rotational movement of the electrical conductors 42 and 44 once disposed in the respective attachment member sections 39 and 41.

While an example pass through plate 10 has been illustrated in FIGS. 1 and 2 as comprising two electrical conductors 42 and 44 and respective attachment members 38 and 40, it is to be understood that pass through plates as disclosed herein may be configured comprising one or any number of attachment members for accommodating one or any number of electrical conductors as called for by a particular end-use application. Additionally, while the attachment members 38 and 40 have been illustrated at particular locations in the pass through plate body 12, the particular placement locations of the attachment members 38 and 40 in the pass through plate body 12 can and will vary depending on the particular end-use application.

Figures 3, 4:
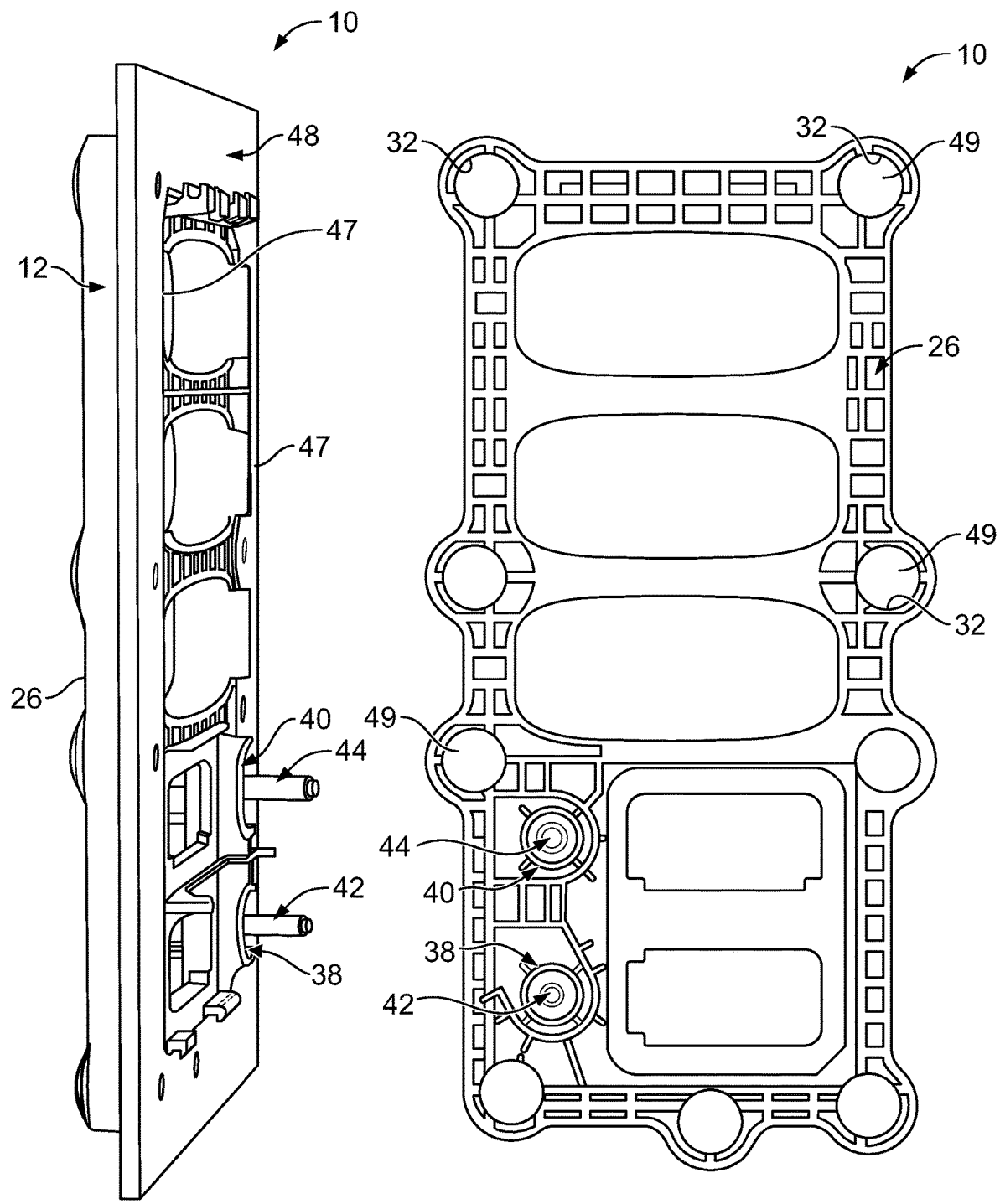
FIG. 3 is a perspective view of the example pass through plate of FIG. 1 as attached to a pedal plate, in accordance with various embodiments.
FIG. 4 is a perspective view of the example pass through plate of FIG. 1 showing an unattached side of the pass through plate, in accordance with various embodiments.

FIG. 3 illustrates the pass through plate 10 as disclosed above as attached with a section of a pedal plate 48. When attached to the pedal plate 48, the pass through plate body second surface 26 that is opposite the body first surface 24 (shown in other figures) extends outwardly away from the pedal plate 48 and into a passenger compartment when used in a vehicle application. In this attached state, the electrical conductors 42 and 44 are shown both disposed within the respective attachment members 38 and 40 of the pass through plate 10, and extending through an opening 47 of the pedal plate 48 to facilitate connection, e.g., with an electrical element, within an engine compartment when used with a vehicle.

Referring to FIG. 4, the pass through plate 10 body second surface 26 is shown comprising plugs 49 that are disposed in the attachment holes 32 for sealing off the holes 32. The attachment members 38 and 40 are also illustrated accommodating attachment of the respective electrical conductors 42 and 44. Referring back to FIG. 2, the electrical conductors 42 and 44 are each configured having a pair of axially opposed terminals 50 and 52 extending therefrom to facilitate electrical connection respectively in the engine compartment and passenger compartment of a vehicle. When attached within respective attachment members 38 and 40, each electrical conductor terminal 50 extends outwardly a distance from the pass through plate body first surface 24 and each electrical conductor terminal 52 extends outwardly a distance from the opposing pass through plate body second surface 26. The ends of the electrical conductor terminals 50 and 52 may be configured and/or include a surface feature for promoting connection with an electrical element such as an electrical connector or the like. In various embodiments, the electrical conductors 42 and 44 each have a section 53 that extends radially outwardly and that is positioned axially between the terminals 50 and 52. As noted above, the electrical conductor section 53 may have an outer surface configured (e.g., having a geometric shape or the like) to fit within the sections 39 and 41 of respective attachment members 38 or 40 that are each configured to complement the electrical conductor section 53 of the electrical conductors 42 and 44 to thereby prevent rotational movement of the electrical conductors 42 and 44 once disposed within the respective attachment members 38 and 40.

Figure 5A:
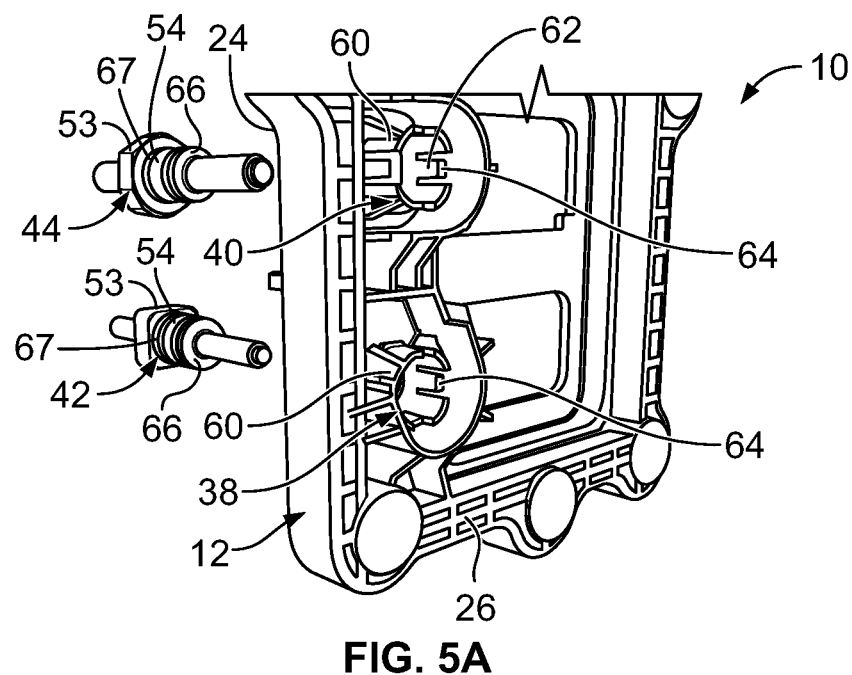
FIG. 5A is a perspective view of the example pass through plate of FIG. 1 showing electrical conductors in an unattached state, in accordance with various embodiments.
Figure 5B:
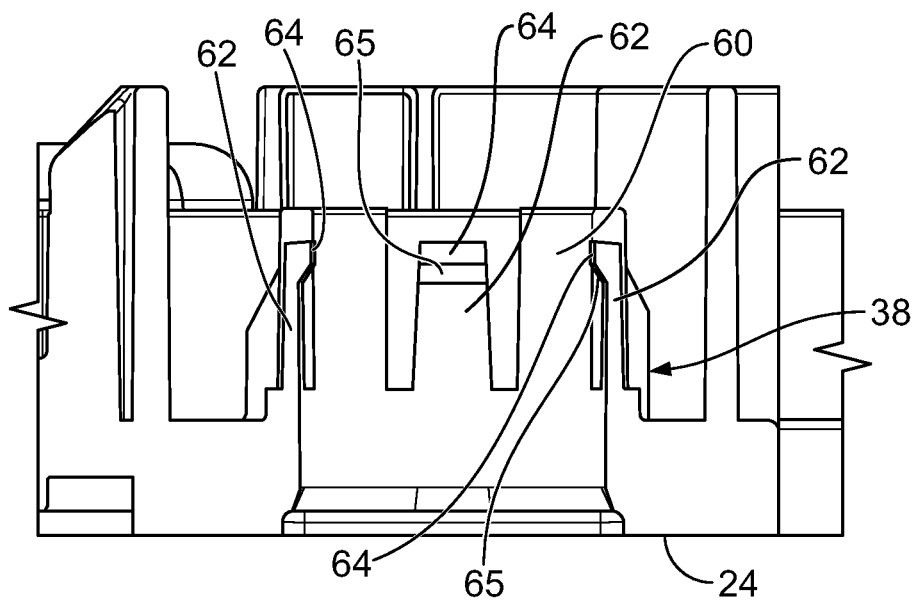
FIG. 5B is a cross-sectional view of an electrical conductor attachment member as embodied in the example pass through plate of FIG. 1, in accordance with various embodiments.

FIG. 5A illustrates a section of the example pass through plate 10 body 12 that includes the attachment members 38 and 40 as shown from the body second surface 26. Referring to FIGS. 5A and 5B, the attachment members 38 and 40 are similarly configured and comprise a socket 60 having a wall structure that is configured to accommodate placement of a section of the respective electrical conductors 42 and 44 therethrough. In various embodiments, each electrical conductor 42 and 44 enters the respective attachment member 38 and 40 from the body first surface 24. In various embodiments, the electrical conductors 42 and 44 each have a cylindrical outer section 54 that extends axially from section 53 having the geometric shape. The attachment member socket 60 includes an inside surface that is shaped (e.g., that is cylindrical) to accommodate placement of the electrical conductor outer section 54 therein. The socket 60 extends outwardly a distance from the pass through plate body 12 and has an axial length designed to provide a desired degree of lateral support to the electrical conductors 42 and 44 once attached therein to protect against lateral force loads that may be placed on the electrical conductors 42 and 44 during use, thereby providing a strong and robust attachment point with the pass through plate 10.

The attachment member socket 60 comprises one or more latch elements 62 that extend axially along the wall structure and that are separated or detached therefrom a partial axial length extending from a peripheral end of the socket wall structure. Configured in this matter, the latch elements 62 are able to move or deflect radially a desired degree relative to the remaining socket wall structure to facilitate installation of a respective electrical conductor 42 and 44 therein. In various embodiments, the socket 60 comprises four latch elements 62 that are arranged in pairs and the latch elements 62 in the pair are diametrically opposed from one another along the socket wall structure. Each of the latch elements 62 includes a terminal end that is configured having a radially inwardly disposed lip 64. Each electrical conductor 42 and 44 is configured having a radially outwardly extending collar or flange 66 that is positioned axially away from the outer section 54. The electrical conductor flange 66 is configured to engage each latch element 62 and pass over the lip 64 when each electrical conductor 42 and 44 is completely axially disposed within the respective sockets 60. During installation of each electrical conductor 42 and 44 within the respective sockets 60, the latch elements 62 and lips 64 deflect radially outwardly to accommodate passage of the electrical conductor flange 66 thereby. In various embodiments, the latch element lips 64 are configured having a beveled inside surface 65 to facilitate an outward deflection of the lip 64 and passage of the electrical conductor flange 66 past the lip 64 during installation. Upon full insertion of the electrical conductors 42 and 44 in the respective sockets 60 (i.e., once the electrical conductor flange 66 has passed by the latch element lips 64), the latch element lips 64 retract radially inwardly and make contact with an axial surface of the electrical conductor adjacent a backside surface of the flange 66 to thereby axially retain the electrical conductors 42 and 44 within the respective sockets 60.

Referring to FIG. 5A, the electrical conductors 42 and 44 may comprise a sealing element 67 in the form of annular elastomeric seal that is positioned axially along the electrical conductors 42 and 44 between section 53 having the geometric shape and the flange 66 to provide a seal, e.g., a leak-tight seal, between the electrical conductors 42 and 44 and the respective sockets 60. While the use of a seal 67 with the electrical conductors 42 and 44 has been illustrated, it is to be understood that the use of a seal 67 is optional depending on the particular end-use application.

Figure 6A:
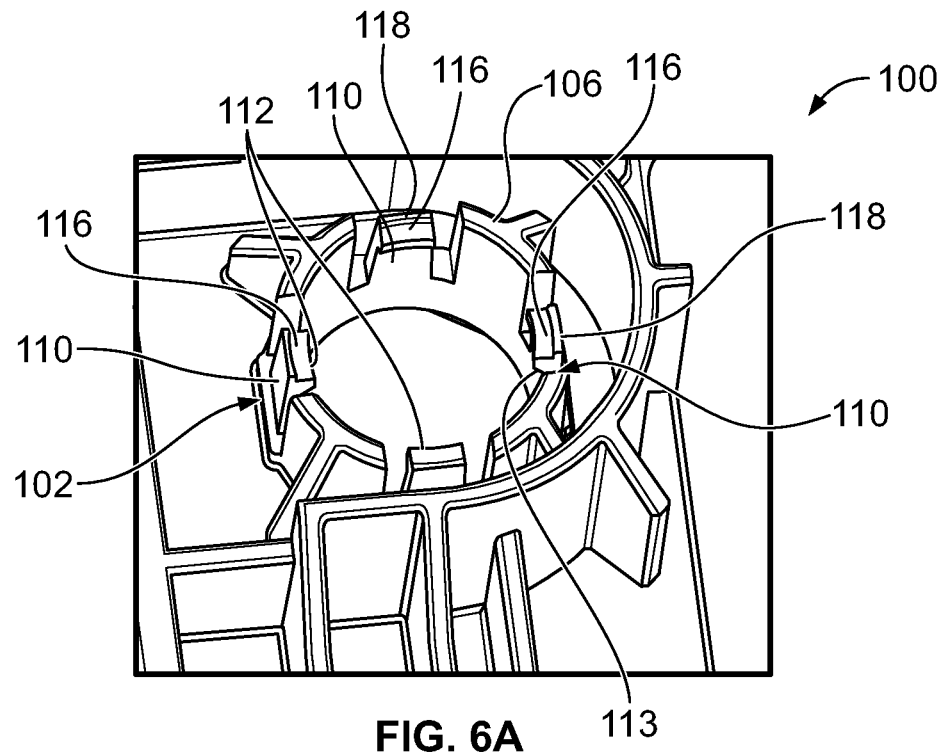
FIG. 6A is a perspective view of a section of an example pass through plate showing an example electrical conductor attachment member as embodied therein, in accordance with various embodiments.
Figure 6B:
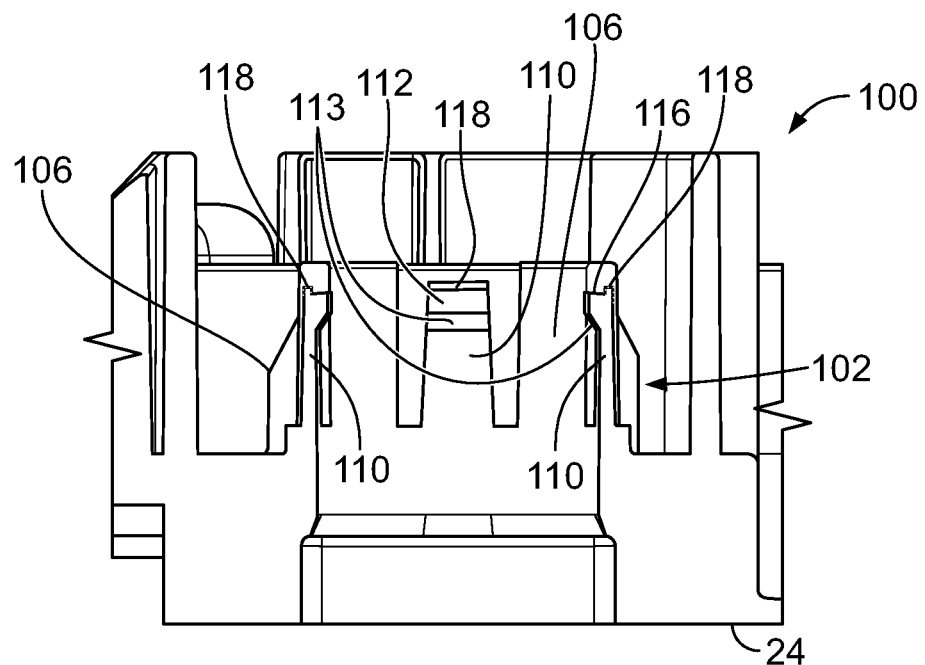
FIG. 6B is a cross-sectional view of the example pass through plate electrical conductor attachment member of FIG. 6A, in accordance with various embodiments.

FIGS. 6A and 6B illustrate a section of an example pass through plate 100 as disclosed herein comprising the features described above. In this example, the pass through plate 100 attachment member 102 is configured slightly different from that described above and illustrated in FIGS. 5A and 5B. The attachment member 102 comprises a socket 106 with a wall structure that includes latch elements 110 comprising radially inwardly directed lips 112 having a beveled inside surface 113. In this example, the latch elements 110 are additionally configured having an axial end above the lip 112 that includes a recessed section 116 that forms a wall section 118 that extends axially a distance outwardly from the lip 112. The wall section 118 extends from an axial end of each latch element lip 112 to provide a surface feature that can be engaged by an operator or technician with a tool (e.g., a bladed tool like a screwdriver or the like) to move the latch elements lips 112 radially outward and away from contact with the electrical conductor disposed within the socket 106 to facilitate detaching and removing the electrical conductor from the pass through plate 100. This is understood to be but one example of how the attachment members in pass through plates may be configured to accommodate releasable attachment of the respective electrical conductors therefrom, and all such other variations that operate to achieve the same function are intended to be within the scope of this disclosure. For example, for the pass through plate examples described above and illustrated in FIGS. 1 to 5B, the electrical conductors 42 and 44 may be released from attachment within respective attachment members 38 and 40 by inserting a tool (e.g., a bladed tool like a screwdriver or the like) into the attachment member sockets 60 from the pass through plate body first surface 24 to urge the latch elements 62 and lips 64 radially outward and away from contact with the respective electrical conductors 42 and 44.

Figure 7A:
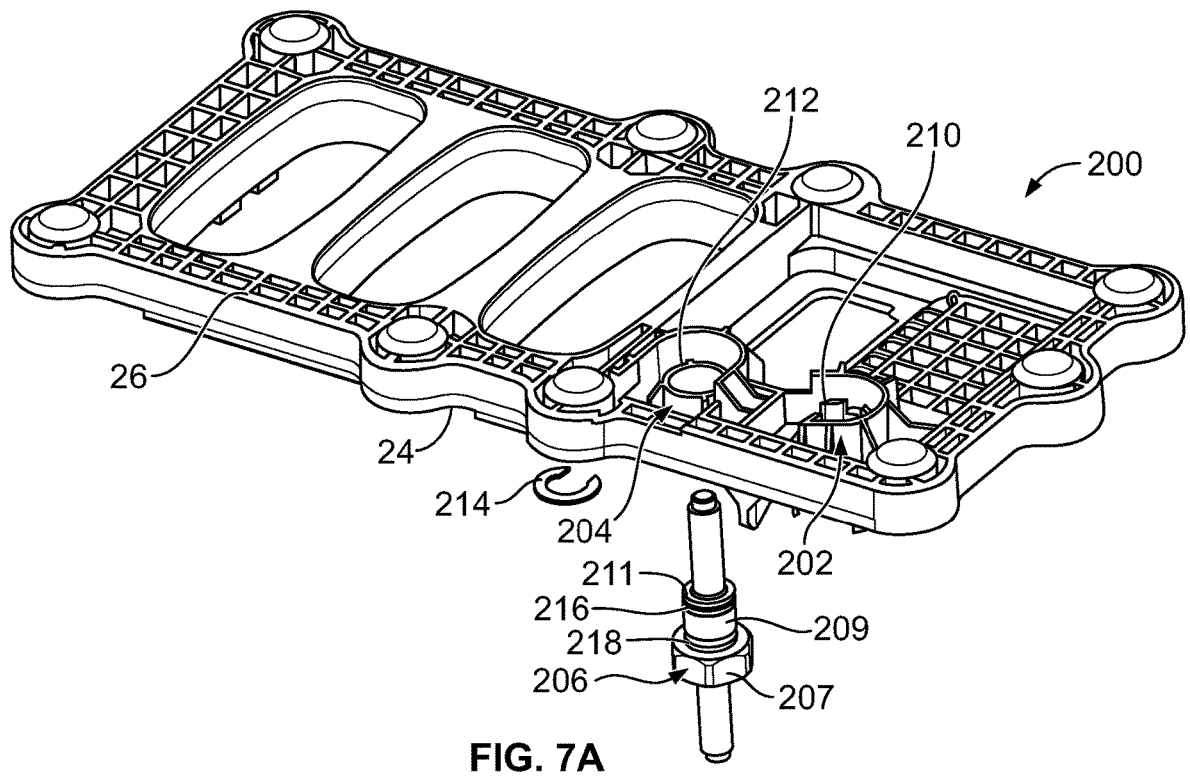
FIG. 7A is a perspective view of an example pass through plate and electrical conductor in an unassembled state, in accordance with various embodiments.
Figure 7B:
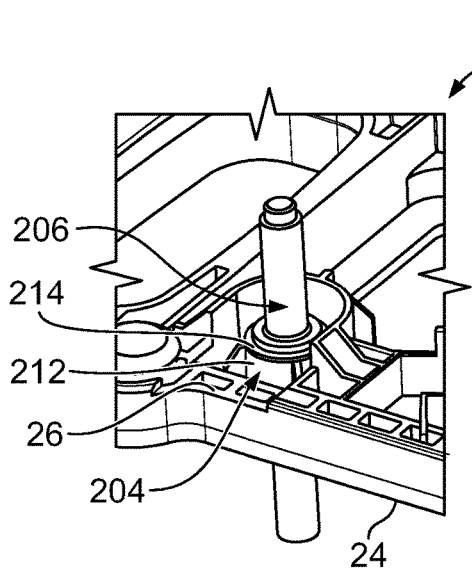
FIG. 7B is a perspective view of a section of the pass through plate of FIG. 7A showing the electrical conductor disposed within a pass through plate attachment member, in accordance with various embodiments.
Figure 7C:
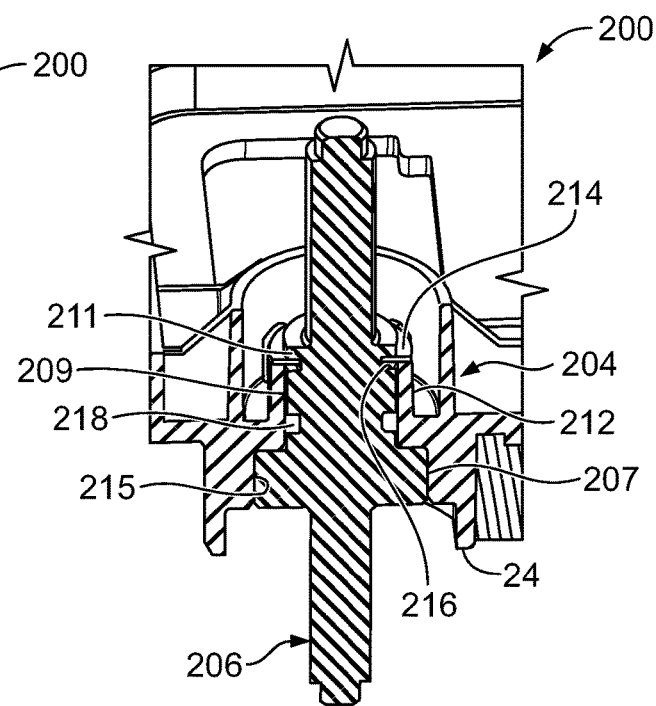
FIG. 7C is a cross-sectional view of a section of the pass through plate of FIG. 7A showing the electrical conductor disposed within the pass through plate attachment member, in accordance with various embodiments.

FIGS. 7A to 7C illustrate an example pass through plate 200 having the same general construction as described above for the example illustrated in FIGS. 1 to 4, with a difference being the configuration of the attachment members 202 and 204 and manner in which the same cooperate with the electrical conductor 206. In this example, rather than the attachment members 202 and 204 comprising a socket with latch elements that capture the electrical conductor to fix the electrical conductor axially therein, the attachment members 202 and 204 each comprise sockets 210 and 212 having a continuous wall structure that extends axially to a peripheral end. With reference to FIGS. 7B and 7C, the socket 212 has an inside diameter sized to accommodate placement of the electrical conductor 206 therein. The electrical conductor 206 may be configured in the manner described above comprising a section 207 having a geometric outer shape for placement within a complementary section 215 of the attachment member 204 adjacent the body first surface 24. Additionally, the electrical conductor 206 may include the outer cylindrical section 209 that is disposed within the inside diameter of the socket 212. Further, the electrical conductor 206 may include the flange 211 that is located axially a distance away from the cylindrical section 209.

The electrical conductor 206, once fully inserted into the attachment member socket 212, is axially retained within the socket 212 by the use of an external retaining element 214 in the form of a clip or the like. The electrical conductor 206 comprises a reduced diameter section or recessed groove 216 that is positioned axially along the electrical conductor 206 before the flange 211. The recessed groove 216 is exposed and accessible at the peripheral end of the socket 212 when the electrical conductor 206 is fully inserted therein, thereby enabling the clip 214 to be disposed within the recessed groove 216. The clip 214 is configured having an outer dimension sized greater than that of the socket 212 to thereby prevent the electrical conductor 206 from retracting axially within the socket 212 once the clip 214 is attached. In this example, the pass through plate body second surface 26 is configured having a section adjacent the socket 212 that is sized less than or equal to a height of the socket 212 to thereby enable a user to easily access a peripheral end of the socket 212 from a side or lateral direction to attach the clip 214 onto the electrical conductor 206. While a retaining element in the form of a clip has been disclosed and illustrated, it is to be understood that other configurations of external retaining elements may be used to retain axial placement of the electrical conductor 206 within the attachment members 202 and 204, and that use of all such other types of external retaining elements are intended to be within the scope of this disclosure. Also, the electrical conductor 206 may include an optional seal element 218 to provide a seal, e.g., a leak-tight seal, between the electrical conductor 206 and the socket 212 to prevent moisture from traversing through the pass through plate 200.

Figures 8A, 8B:
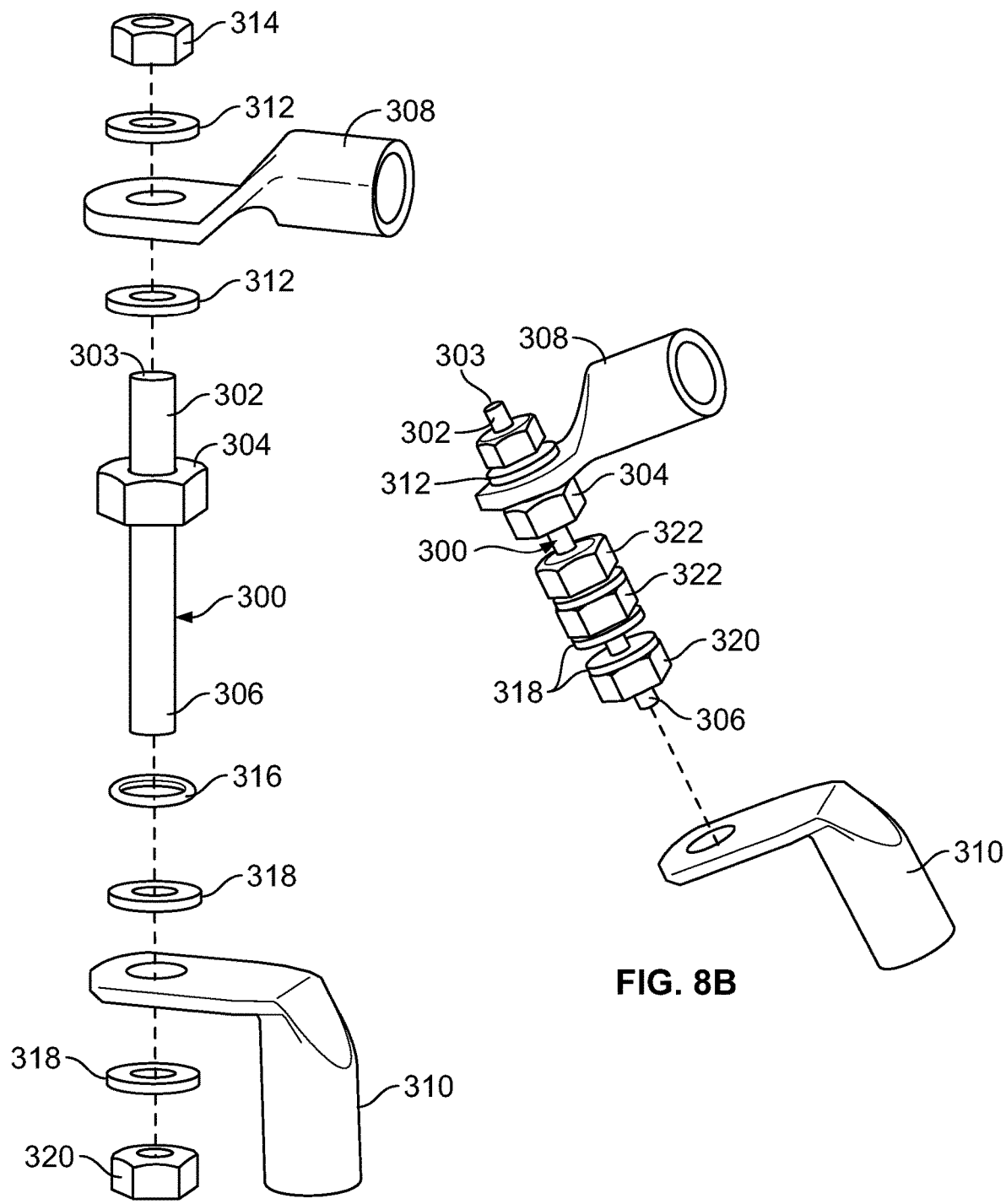
FIG. 8A illustrates a perspective view of an electrical conductor in an unassembled state for use with an example pass through plate, in accordance with various embodiments.
FIG. 8B illustrates a perspective view of the electrical conductor of FIG. 8A in an assembled state for use with an example pass through plate, in accordance with various embodiments.

FIGS. 8A and 8B illustrate an example electrical conductor 300 that may be used with pass through plate constructions as disclosed herein. In various embodiments, the pass through plate may include an opening therethrough to accommodate placement of the electrical conductor 300. In various embodiments, the opening extends between opposed first and second surfaces of the pass through plate. Unlike the examples described above, the openings may or may not include retaining features such as latch elements or the like. The electrical conductor 300 includes a first terminal section 302 that may be threaded and that extends axially from an end 303 to a radially extending geometric feature or nut 304 that may be fixed on the electrical conductor 300. Extending axially away from the nut 304, the electrical conductor 300 includes a second terminal section 306 that may be threaded. Referring to FIG. 8A, the electrical conductor 300 may be disposed within the opening in the pass through plate leading with the second terminal section 306 so that the fixed nut extends from the first or second surface of the pass through plate that is disposed within a vehicle passenger compartment, i.e., with the second terminal section 306 extending into a vehicle engine compartment once the pass through plate is mounted to a pedal plate. Electrical connectors 308 and 310 are attached with respective electrical conductor first and second terminal sections 302 and 306, wherein washers 312 and a nut 314 are used to fasten the electrical connector 308 to the electrical conductor first terminal section 302. A sealing element 316, e.g., in the form of an annular seal, is optional and may be positioned over the second terminal section 306 and against an adjacent first or second surface of the pass through plate to provide a seal between the electrical conductor 300 and the pass through plate. Washers 318 and a nut 320 are used to fasten the electrical connector 310 to the electrical conductor second terminal section 306. Configured in this manner, the electrical conductor 300 may provide a removable attachment with the pass through plate without the need for a specially configured pass through plate attachment member.

FIG. 8B illustrates the electrical conductor 300 (as described above and illustrated in FIG. 8A) as used with two additional nuts 322 to secure the electrical conductor 300 to the pass through plate independent of the attachment between the electrical connector 310 and the electrical conductor second terminal section 306. In this example, after the electrical conductor second terminal section 306 is disposed through the pass through plate opening, a first nut 322 is used to secure the electrical conductor second terminal section 306 to the pass through plate, and a second nut 322 is used to axially secure the first and second nuts together. The remaining portion of the electrical conductor second terminal section 306 is then used to attach the electrical connector 310 thereto using the nut 320. This is but another example of how an electrical conductor may be configured to facilitate removable attachment with pass through plates as disclosed herein.

A feature of pass through plates and electrical conductors is the use of an attachment member that is part of the pass through plate and that is configured to facilitate releasable attachment of electrical conductors therewith, which may enable removal and replacement of the electrical conductor without having to fully or partially remove the pass through plate from attachment with a pedal plate and/or without having to replace the entire pass through plate. Another feature of pass through plates and electrical conductors is the ability to releasably attach the electrical conductor with the pass through plate in a manner preventing rotational movement of the electrical conductor relative to the pass through plate. A further feature of such pass through plates and electrical conductor constructions is the configuration of the attachment member comprising a socket including a wall structure to provide lateral support to the electrical conductor when attached to the pass through plate. The addition of such lateral support helps to provide a strong and robust attachment point with the pass through plate to resist damage that could occur to the pass through plate, the electrical conductor, and/or electrical connections with the electrical conductor from lateral loads or forces imposed on the electrical conductor during use.

The foregoing description and accompanying figures illustrate the principles, preferred embodiments and modes of operation of pass through plate and electrical conductor constructions as disclosed herein. However, such pass through plate and electrical conductor constructions should not be construed as being limited to the particular embodiments discussed above. Additional variations of the embodiments discussed above will be appreciated by those skilled in the art. Therefore, the above-described embodiments should be regarded as illustrative rather than restrictive. Accordingly, it should be appreciated that variations to those embodiments can be made by those skilled in the art without departing from the scope of the pass through plate and electrical conductor constructions as defined by the following claims.

For example, the steps recited in any of the method or process descriptions may be executed in any order and are not limited to the order presented. Moreover, any of the functions or steps may be outsourced to or performed by one or more third parties. Modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set. Furthermore, any reference to singular includes plural embodiments, and any reference to more than one component may include a singular embodiment. Although specific advantages have been enumerated herein, various embodiments may include some, none, or all of the enumerated advantages.

In the detailed description herein, references to "in various embodiments," "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

What is claimed is:

1. A plate for accommodating attachment of an electrical conductor therewith, the plate comprising:
   a body comprising an opposed first surface and second surface, wherein a peripheral edge of the plate is configured for attaching the plate to an external object;
   an attachment member extending between the first surface and the second surface, wherein the attachment member is remote from the plate peripheral edge that is configured for attaching the plate to an external object, and wherein the attachment member comprises a wall structure that extends axially outwardly a distance from the body first or second surface and that is configured to accommodate placement of an electrical conductor axially therein; and
   a retaining element configured to contact the electrical conductor and retain axial placement of the electrical conductor within the attachment member.

2. The plate as recited in claim 1, wherein the retaining element comprises one or more latch elements extending axially along the attachment member wall structure, wherein the one or more latch elements are configured to move radially relative to the wall structure.

3. The plate as recited in claim 2, wherein the one or more latch elements each comprise a lip configured to contact a portion of the electrical conductor once installed in the attachment member.

4. The plate as recited in claim 3, wherein the lip extends radially inwardly a distance from the latch element.

5. The plate as recited in claim 3, wherein the one or more latch elements include a peripheral end having a surface feature configured to permit engaging and moving the latch element radially outward from a position outside of the attachment member.

6. The plate as recited in claim 2, comprising one or more pairs of latch elements, wherein the latch elements of each pair are positioned diametrically opposed from one another.

7. The plate as recited in claim 2, wherein the attachment member and one or more latch elements are each integral with the plate forming a one-piece construction.

8. The plate as recited in claim 1, wherein the retaining element comprises a clip that is configured to attach with a portion of the electrical conductor.

9. The plate as recited in claim 8, wherein the clip is sized larger than a peripheral end of the attachment member wall structure to prevent the clip from moving axially into the wall structure when attached with the electrical conductor.

10. The plate as recited in claim 8, wherein a section of the plate first surface or the second surface adjacent the attachment member is configured to facilitate lateral access to the attachment member for purposes of installing the clip.

11. The plate as recited in claim 1, wherein the attachment member includes a recessed section having a shape that complements a shape of an outer section of the electrical conductor, wherein the recessed section is configured to accommodate placement of the electrical conductor outer section therein to prevent rotational movement of the electrical conductor relative to the plate.

12. A plate for attachment to an external object, the plate comprising:
   a body as defined between an opposed first surface and a second surface, the body having one or more open cavities disposed therethrough and positioned between opposed peripheral edges of the body for accommodating passage of one or more electrical elements therethrough, the body being configured for attachment with an external object that has an opening disposed therethrough;
   an attachment member that is integral with the body and that comprises a wall structure extending outwardly a distance from one of the first surface or the second surface, wherein the wall structure is configured to accommodate placement of an electrical conductor therein for transferring electricity through the plate between the first surface and the second surface; and
   a retaining element that is disposed adjacent the attachment member and that is configured to contact the electrical conductor to axially fix the electrical conductor relative to the attachment member.

13. The plate as recited in claim 12, wherein the retaining element comprises one or more latch elements that are integral with the wall structure and that are configured to move radially to accommodate placement of the electrical conductor through the wall structure.

14. The plate as recited in claim 13, wherein the one or more latch elements extend axially along the wall structure and include a lip positioned at an end of each latch element, wherein the lip extends radially inwardly from the latch element and is configured to contact the electrical conductor when installed in the attachment member wall structure.

15. The plate as recited in claim 13, wherein the one or more latch elements extend axially a length that is less than an axial length of a remaining portion of the wall structure.

16. The plate as recited in claim 14, wherein each latch element includes a surface feature that is accessible externally from the attachment member, wherein the surface feature is configured to permit radial outward movement of the latch out of contact with the electrical conductor.

17. The plate as recited in claim 12, wherein the attachment member includes a section adjacent one of the first surface or the second surface, wherein attachment member section is configured having a shape that complements a shape of an outer section of the electrical conductor, wherein the attachment member section is configured to accommodate placement of the electrical conductor outer section therein to prevent rotational movement of the electrical conductor relative to the plate.

18. A plate for accommodating attachment of an electrical conductor therethrough, the plate comprising:
   a body comprising an opposed first surface and second surface, wherein the body is configured to accommodate attachment with an external object;
   an attachment member extending between the first surface and the second surface and integral with the body, the attachment member comprising:
      a section positioned adjacent one of the first surface or the second surface, the attachment member section being configured to accommodate placement of an outer surface of an electrical conductor therein to prevent rotational movement of the electrical conductor relative to the attachment member; and
      a wall structure extending axially from the attachment member section, the wall section being configured to accommodate placement of the electrical conductor therethrough;
   a retainer that is adjacent the attachment member wall structure and that is configured to connect with the electrical conductor to restrict axial movement of the electrical conductor relative to the plate.

19. The plate as recited in claim 18, wherein the retainer comprises one or more latch elements that are integral with the wall structure, wherein the one or more latch elements are configured to move radially to permit passage of a portion of the electrical conductor thereby, wherein each latch element includes an inwardly projecting lip that is configured to connect with the electrical conductor.

20. The plate as recited in claim 18, wherein the retainer comprises a retaining element that is separate from the plate and is configured to connect with the electrical conductor, wherein the retaining element is sized larger than a peripheral end of the attachment member wall structure to prevent the retaining element from moving axially into the wall structure when connected with the electrical conductor.

\* \* \* \* \*